Figure 1:
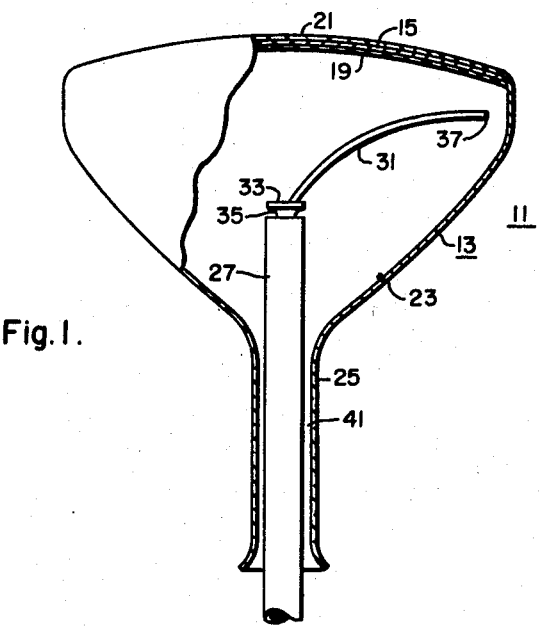

May 17, 1960   D. M. PHILLIPS   2,937,107
METHOD AND APPARATUS FOR MAKING ELECTRON DISCHARGE
DEVICES HAVING LUMINESCENT SCREENS
Filed July 31, 1958

WITNESSES:
Bernard R. Gieguey
James F. Young

INVENTOR
Donald M. Phillips
BY Homer O. Blair
ATTORNEY

United States Patent Office 2,937,107
Patented May 17, 1960

2,937,107

METHOD AND APPARATUS FOR MAKING ELECTRON DISCHARGE DEVICES HAVING LUMINESCENT SCREENS

Donald M. Phillips, Cayuta, N.Y., assignor to Westinghouse Electric Corporation, East Pittsburgh, Pa., a corporation of Pennsylvania Application July 31, 1958, Serial No. 752,311

7 Claims. (Cl. 117—8)

This invention relates to methods and apparatus for making electron discharge devices having luminescent screens and, more particularly, to methods and apparatus for removing excess portions of an organic lacquer and the drying of the remainder of the lacquer, which lacquer is placed on a luminescent screen as a base for a metallic film in electron discharge devices.

In the production of electron discharge devices, for example cathode ray tubes, there are a number of operations which must be done in succession, and they must be of such a nature that they can be done quickly, easily and accurately. Particularly with the recent emphasis on automatic production techniques, it has been found necessary to develop methods which are suitable for these automatic production techniques and which also eliminate production bottlenecks. In addition, it is desirable to utilize techniques which provide for as little operator judgment as possible and which may be accurately done by machines.

For improving the performance of cathode ray tubes, such as those used in television receivers, it has been found desirable to provide a backing of aluminum or other metallic material for the luminescent output screens. For efficient operation, the surface of the aluminum film in contact with the luminescent screen should be as smooth as possible. As the particles of luminescent material form a rough, irregular surface which is unsuitable for the direct deposition of a metallic film, an organic lacquer film is usually provided on the luminescent surface to provide a smooth foundation upon which the aluminum film may be deposited.

There are a number of methods of depositing this lacquer film including the flotation method, the spray method, and the flow-filming method, among others. Although my invention is applicable to other methods, it will be discussed particularly with reference to the flow-filming method as disclosed in U.S. Patent 2,770,557 by Eros Atti, entitled "Cathode Ray Tube Screen Filming by a Flow Method," which is assigned to the same assignee as the subject application.

In the commercial use of the flow-filming process, a certain amount of lacquer is placed in the cathode ray tube bulb after the luminescent screen has been deposited and is then applied to the screen by the method disclosed in the above-mentioned Atti patent. It has been found in commercial production that it is usually desirable or prudent to have a small excess of lacquer in the bulb to make sure that the luminescent screen is properly coated. However, it is found that this excess lacquer coats the portions of the cathode ray tube bulb which are adjacent the luminescent screen, and if this excess coating is not removed before the aluminizing process, the aluminum layer will form blisters and peel away from the glass which, of course, is undesirable.

In the current commercial flow-filming process, it is necessary to place the cathode ray tube bulb in a horizontal position for about one and one-half minutes to allow the excess lacquer to drain away from the luminescent screen. After this one and one-half minutes of lacquer drain, the portions of the bulb envelope adjacent the luminescent screen are rinsed with a suitable liquid, such as water, to remove the excess liquid lacquer. Therefore, a total cumulative time of two minutes is expended in the rinsing operation of each bulb. It has been found that in methods other than the flow-filming method, this drainage time may be as much as 15 minutes.

As the application of lacquer film itself requires slightly less than one minute, it is seen that the bulbs are filmed twice as fast as they are drained and rinsed which requires additional equipment, operators, etc. to avoid a production bottleneck. Also, with automatic production techniques, extremely long conveyors and extra numbers of rinsing units are necessary to keep the manufacturing process going smoothly.

In the present commercial production method, the lacquer film must be dried immediately after the rinsing operation to prevent subsequent blistering and peeling of the aluminum film. Also, with the present method, a sizable number of cathode ray tubes are not satisfactory because the operator fails to observe the proper time limits for the drainage and rinsing operations.

In general, my invention provides an improved method and apparatus for a substantially simultaneous rinsing (removing) and lacquer film drying operation which has been found to provide a higher percentage of satisfactory cathode ray tubes, which is easier and quicker to accomplish than prior art techniques and which is readily adaptable for automatic production techniques.

Therefore, it is an object of this invention to provide an improved method of processing an electron discharge device having a luminescent screen before the luminescent screen is metallized.

It is another object to provide an improved method of rinsing and drying the lacquer film on a luminescent screen of an electron discharge device.

It is a further object to provide an improved method of substantially simultaneously rinsing and drying the lacquer on the luminescent screen of an electron discharge device.

It is an auxiliary object of this invention to provide an improved method of processing a cathode ray tube before the luminescent screen is aluminized.

It is still another object to provide an improved method of rinsing and drying the lacquer film on a luminescent screen of a cathode ray tube.

It is a still further object to provide an improved method of substantially simultaneously rinsing and drying the lacquer on the luminescent screen of a cathode ray tube.

It is an additional object to provide suitable apparatus for accomplishing the above objects.

Figure 2:
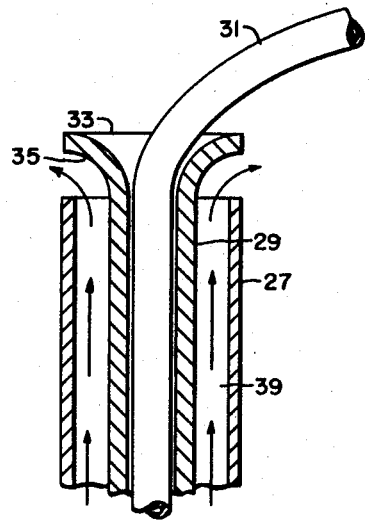

These and other objects of this invention will be apparent from the following description, taken in accordance with the accompanying drawing, throughout which like reference characters indicate like parts, which drawing forms a part of this application, and in which:

Figure 1 is a partly sectional schematic view of a partially assembled cathode ray tube and apparatus for processing said tube in accordance with one embodiment of my invention; and Fig. 2 is a partly sectional view of a portion of the apparatus shown in Fig. 1.

In Fig. 1, a partially-assembled cathode ray tube 11 is shown including an envelope 13 having a faceplate portion 21, a funnel portion 23, and a neck portion 25. A luminescent screen 15 may be placed on the faceplate 21 of the cathode ray tube 11 by a suitable method, such as a settling process. An organic lacquer material 19 may then be deposited upon the luminescent screen 15 by a method such as that disclosed in the above-mentioned Atti patent. The lacquer film 19 may be made of any suitable material which will form a smooth film and which may be easily removed during the baking steps of the manufacture. Suitable materials include isobutyl methacrylate in toluene, butyl methacrylate in toluene, nitrocellulose or other organic film-forming materials.

In practice, the excess lacquer from the filming operation coats the portions of the envelope 13 adjacent the luminescent screen 15. I have found that the excess lacquer may be rinsed immediately without a draining operation if the cathode ray tube bulb is flushed with air during the rinsing operation. The incoming air removes the lacquer-solvent saturated atmosphere within the bulb causing the lacquer film 19 to become firm. This prevents the lacquer film 19 from draining onto portions of the tube envelope 13 adjacent the phosphor screen 15 after the liquid rinse has been completed. The operation may be performed by inserting suitable apparatus within the neck portion 25 of the cathode ray tube envelope 13 as will be described below.

As shown in Fig. 2, this apparatus includes a hollow tubular air guide member 27 which has a tubular inner guide 29 positioned within the air guide member 27. Within the inner guide 29 is positioned a flexible tubular liquid dispenser 31 which may be made of a suitable plastic or metal material such as vinylidene chloride or a flexible stainless steel conduit. As can be seen, the inner guide 29 has an end portion 33 which extends slightly further into the interior of the cathode ray tube bulb than the air guide member 27.

The inner guide end portion 33 includes an air deflection portion 35 which, in this particular embodiment, is shown in a flared configuration. It can readily be seen, particularly as indicated by the arrows in Fig. 2, that incoming air may enter the interior of the cathode ray tube bulb by means of the air intake space 39 which is located between the inner guide 29 and the air guide member 27. The incoming air is deflected by the deflection portion 35 and therefore is prevented from impinging directly and forcibly upon the lacquer film 19 and thus merely circulates over the lacquer film 19. It has been found that if the air stream impinges directly on the lacquer film 19, portions of this film are dried too quickly and that certain still-liquid portions are displaced, which may lead to an uneven surface and subsequent irregularities in the formation of the aluminum film and in the picture formed on the screen of the cathode ray tube.

It can also be readily seen that the air may leave the interior of the cathode ray tube bulb by means of the air outlet space 41 which is located between the air guide member 27 and the neck portion 25 of the envelope 13.

The liquid dispenser 31 extends into the interior of the cathode ray tube bulb and is bent so that the end portion 37 of the liquid dispenser 31 is closely spaced from the portion of the envelope 13 which is adjacent the luminescent screen 15 and from which the excess lacquer is to be removed. Thus, a suitable liquid, such as water, may be squirted from the liquid dispenser 31 to rinse away the excess lacquer on these portions of the envelope 13 adjacent the luminescent screen 15.

In one particular example relating to a so-called rectangular, 21-inch, 90° cathode ray tube, air which has been electro-dried to remove moisture (having a relative humidity between approximately 10% and 15%) and which is at a temperature of approximately 100° to 105° F. is injected into the bulb at a rate of 120 cu. ft./hr. for a period of approximately 25 seconds. It is found that this period is adequate to make the lacquer film sufficiently firm so that no later blistering or peeling of the aluminum film will occur. At the same time water is injected at a rate of approximately 950 cc./minute for about 25 seconds to remove the excess lacquer. It has been found desirable to start the air injection at the same time as the liquid rinse to prevent the excess lacquer from becoming prematurely firm which would make it difficult to remove by means of a liquid rinse. After the liquid rinse and the air drying process have been completed, the apparatus is removed from the cathode ray tube bulb and the bulb is aluminized in the normal manner and is further processed to complete the manufacture of the cathode ray tube bulb.

Other liquids, such as toluene or acetone may be used in place of water for the liquid rinsing material if desired. Also gases other than air may be used, such as nitrogen, argon, or other inert gases. However, the above mentioned liquids and gases should not enter into deleterious chemical reactions with the lacquer, the luminescent screen or other materials which are exposed to them.

The times and rates involved may be varied depending upon the temperature of the incoming air, the consistency of the lacquer material, the size of the cathode ray tube, etc. Also, details of the particular structures disclosed may be changed if desired without changing the principles involved. For example, while the air guide member 27, the tubular inner guide 29 and the liquid dispenser are shown as being coaxial and cylindrical, they may be of noncylindrical cross section and be eccentrically positioned if desired as long as the flow of the air and the liquid are maintained.

While it is desirable for the air drying and the liquid rinsing to start simultaneously, in some instances satisfactory results may be obtained if the air drying and liquid rinsing steps take place substantially at the same time, but do not actually start and stop simultaneously.

It has been found in actual cathode ray tube production that this invention causes fewer unsatisfactory bulbs to be formed, requires less equipment, less operator skill, less manufacturing costs, and the entire rinsing operation may be done in 30 seconds. The timing of the operations may be machine controlled by automatic timers, and the method and apparatus are readily adaptable to automatic production techniques. Of course, the principles of this invention are applicable to any electron discharge device having a luminescent screen upon which a lacquer film is to be placed, and is not limited to cathode ray tubes.

While the present invention has been shown in one form only, it will be obvious to those skilled in the art that it is not so limited but is susceptible of various changes and modifications without departing from the spirit and scope thereof.

I claim as my invention:

1. The method of treating a luminescent screen in a cathode ray tube before metallizing said luminescent screen, said method including the steps of applying a liquid lacquer film to said luminescent screen, removing at least part of the excess lacquer by a liquid rinsing process, and, substantially simultaneously with said rinsing process, directing gas into said tube to circulate and displace the atmosphere over said lacquer film thereby solidifying said lacquer film.

2. The method of treating a luminescent screen in a cathode ray tube before metallizing said luminescent screen, said method including the steps of applying a liquid lacquer film to said luminescent screen, removing at least part of the excess lacquer by a water rinsing process, and, substantially simultaneously with said rinsing process, directing air into said tube to circulate and displace the atmosphere in said tube to solidify said lacquer film.

3. The method of treating a luminescent screen in a cathode ray tube, said method including the steps of applying a liquid lacquer film to said luminescent screen and areas adjacent thereto, removing at least part of the portion of the liquid lacquer film located on said areas adjacent said luminescent screen by a liquid rinsing process, and, substantially simultaneously with said rinsing process, directing gas into said tube to circulate and displace the atmosphere over said lacquer film thereby solidifying said lacquer film so that a smooth surface is formed, and evaporating a metallic layer upon said smooth surface of said lacquer film.

4. Apparatus for removing at least part of the excess lacquer film on a luminescent screen in a cathode ray tube substantially simultaneously with flowing gas over said lacquer film thereby solidifying said lacquer film, said apparatus being operable to extend into said cathode ray tube, said apparatus including a hollow tubular gas guide member having an axis, a tubular inner guide coaxial with and within said gas guide member, a flexible tubular liquid dispenser positioned within said inner guide member, the end portion of said tubular inner guide being operable to protrude further into said cathode ray tube than said gas guide member, said inner guide end portion comprising gas deflection means being operable to deflect gas passing through said gas guide member at an angle to said gas guide member axis.

5. Apparatus for removing at least part of the excess lacquer on the luminescent screen in a cathode ray tube substantially simultaneously with flowing air over said lacquer film, thereby solidifying said lacquer film, said apparatus being operable to extend into said cathode ray tube, said apparatus including a hollow cylindrical tubular air guide member having an axis, a cylindrical tubular inner guide coaxial with and within said air guide member, a cylindrical flexible tubular liquid dispenser positioned within said inner guide member, said liquid dispenser being operable to dispense a rinsing liquid on portions of said excess lacquer to thereby remove said excess lacquer, the end portion of said tubular inner guide being operable to protrude slightly further into said cathode ray tube than said air guide member, said inner guide end portion comprising flared air deflection means being operable to deflect air passing through said air guide member at an angle to said air guide member axis.

6. Apparatus for removing at least part of the excess lacquer on a luminescent screen in a cathode ray tube substantially simultaneously with flowing air over said lacquer film, thereby solidifying said lacquer film, said apparatus being operable to extend into said cathode ray tube, said apparatus including a hollow tubular air guide member, a tubular inner guide within said air guide member, a flexible tubular liquid dispenser positioned within said inner guide member and being operable to dispense a liquid rinsing material upon portions of said excess lacquer film thereby removing said excess lacquer film, the end portion of said tubular inner guide being operable to protrude slightly further into said cathode ray tube than said air guide member, said inner guide end portion comprising air deflection means being operable to deflect air passing through said air guide member so that said air does not impinge directly on said lacquer film.

7. The method of treating a luminescent screen in a cathode ray tube before metallizing said luminescent screen, said method including the steps of applying a liquid lacquer film to said luminescent screen, removing at least a part of the excess lacquer by a water rinsing process, and, substantially simultaneously with said rinsing process, directing air into said tube to flush the atmosphere from said tube to solidify said lacquer film.

References Cited in the file of this patent

UNITED STATES PATENTS

| | | |
|---|---|---|
| 2,619,430 | Fink | Nov. 25, 1952 |
| 2,643,956 | Kuebler et al. | June 30, 1953 |
| 2,676,110 | Hesse | Apr. 20, 1954 |
| 2,763,564 | McKenzie et al. | Sept. 18, 1956 |
| 2,858,797 | Levin | Nov. 4, 1958 |